US00RE45755E

(19) United States
(12) Reissued Patent
Ahmad et al.

(10) Patent Number: US RE45,755 E
(45) Date of Reissued Patent: Oct. 13, 2015

(54) DYNAMIC PHASE TIMING CONTROL FOR MULTIPLE REGULATORS OR PHASES

(71) Applicant: INTERSIL AMERICAS INC., Milpitas, CA (US)

(72) Inventors: Faisal Ahmad, San Jose, CA (US); Weihong Qiu, San Ramon, CA (US); Nattorn Pongratananukul, San Jose, CA (US)

(73) Assignee: Intersil Americas LLC, Milpitas, CA (US)

(21) Appl. No.: 14/231,113

(22) Filed: Mar. 31, 2014

Related U.S. Patent Documents

Reissue of:
(64) Patent No.: 8,233,299
Issued: Jul. 31, 2012
Appl. No.: 12/650,772
Filed: Dec. 31, 2009

U.S. Applications:
(60) Provisional application No. 61/150,386, filed on Feb. 6, 2009.

(51) Int. Cl.
*H02J 1/10* (2006.01)
*H02M 3/158* (2006.01)

(52) U.S. Cl.
CPC ..... *H02M 3/1584* (2013.01)

(58) Field of Classification Search
CPC H02M 3/1584; H02M 3/157; H02M 3/33561
USPC ..... 363/65, 71, 72; 323/272, 283
See application file for complete search history.

(56) References Cited

U.S. PATENT DOCUMENTS

| | | | | |
|---|---|---|---|---|
| 6,141,231 | A * | 10/2000 | Brkovic | 363/72 |
| 6,285,172 | B1 * | 9/2001 | Torbey | 323/237 |
| 6,564,278 | B1 * | 5/2003 | Olson | 710/301 |
| 7,518,894 | B2 * | 4/2009 | Fosler et al. | 363/72 |
| 7,571,359 | B2 * | 8/2009 | Gutnik et al. | 714/700 |
| 7,584,371 | B2 * | 9/2009 | Zhang | 713/310 |
| 7,616,463 | B2 * | 11/2009 | Burstein | 363/72 |
| 7,737,669 | B2 * | 6/2010 | Jain | 323/272 |
| 7,872,886 | B2 * | 1/2011 | Xu et al. | 363/65 |
| 2007/0291520 | A1 * | 12/2007 | Schuellein | 363/65 |

OTHER PUBLICATIONS

U.S. Patent and Trademark Office, "Notice of Allowance", "from U.S. Appl. No. 12/650,772", May 16, 2012, pp. 1-12, Published in: US.

U.S. Patent and Trademark Office, "Office Action", "from U.S. Appl. No. 12/650,772", Dec. 23, 2011, pp. 1-19, Published in: US.

* cited by examiner

*Primary Examiner* — Linh M Nguyen
(74) *Attorney, Agent, or Firm* — Fogg & Powers LLC

(57) ABSTRACT

A drive control circuit generates switching drive signals for a single phase of a multiphase voltage regulator. A driver circuitry generates the switching drive signals for the voltage regulator responsive to a clock signal. A clock circuitry generates the clock signal responsive to a monitored external clock signal. A phase number detector determines a number of active phases in the multiphase voltage regulator in real time responsive to an indicator on a phase number input monitored by the phase detector.

23 Claims, 8 Drawing Sheets

DYNAMIC PHASE TIMING CONTROL FOR MULTIPLE REGULATORS OR PHASES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is a reissue of U.S. Pat. No. 8,233,299* (*Ser. No. 12/650,772*), *filed on Dec. 31, 2009 and issued on Jul. 31, 2012, which* claims priority from U.S. Provisional Patent Application Ser. No. 61/150,386 filed on Feb. 6, 2009, entitled DYNAMIC PHASE TIMING CONTROL FOR MULTIPLE REGULATORS OR PHASES, [all] *both* of which [is] *are* incorporated herein by reference.

BRIEF DESCRIPTION OF THE DRAWINGS

For a more complete understanding, reference is now made to the following description taken in conjunction with the accompanying Drawings in which.

DETAILED DESCRIPTION

Figure 1:
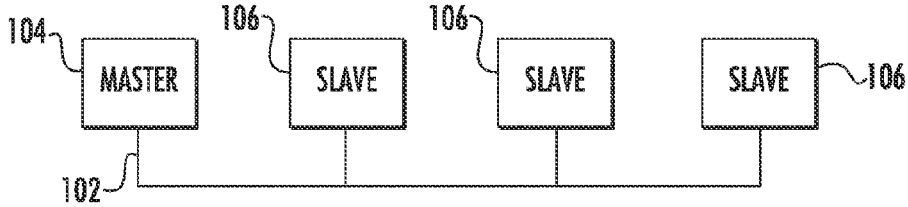
FIG. 1 illustrates a master/slave configuration of multiple voltage regulators.

Referring now to the drawings, wherein like reference numbers are used herein to designate like elements throughout, the various views and embodiments of a dynamic phase timing control for multiple regulators or phases are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

FIG. 1 illustrates a block diagram of a plurality of voltage regulators that are interconnected via a single bus 102. The voltage regulators comprise a master 104 which ultimately controls the transmission of information over the interconnecting bus 102 and a number of slaves 106 that interact with the master 104 via the bus 102. At any particular time there is only a single voltage regulator acting as the master 104. However, in various configurations it is possible for any of the voltage regulators to operate as the master 104. Thus, a slave 106 may take control of the system and operate as the master 104 in the event that an existing master fails for some reason. Existing master/slave configurations use daisy chain schemes that are adapted to achieve the phase shift between the various voltage regulator modules. The prior art includes a number of drawbacks such as when the master module is dead, the phase shift and clock synchronization are lost. Additionally, the phase shift within a regulator module's clock depends on the total number of regulator modules present. When adding or removing voltage regulator modules, some components will have to be replaced in order to compensate for the new settings. Thus, there is presently no way to dynamically provide for optimal phase time between multiple active phases or outputs in point of load voltage regulators.

Figure 2:
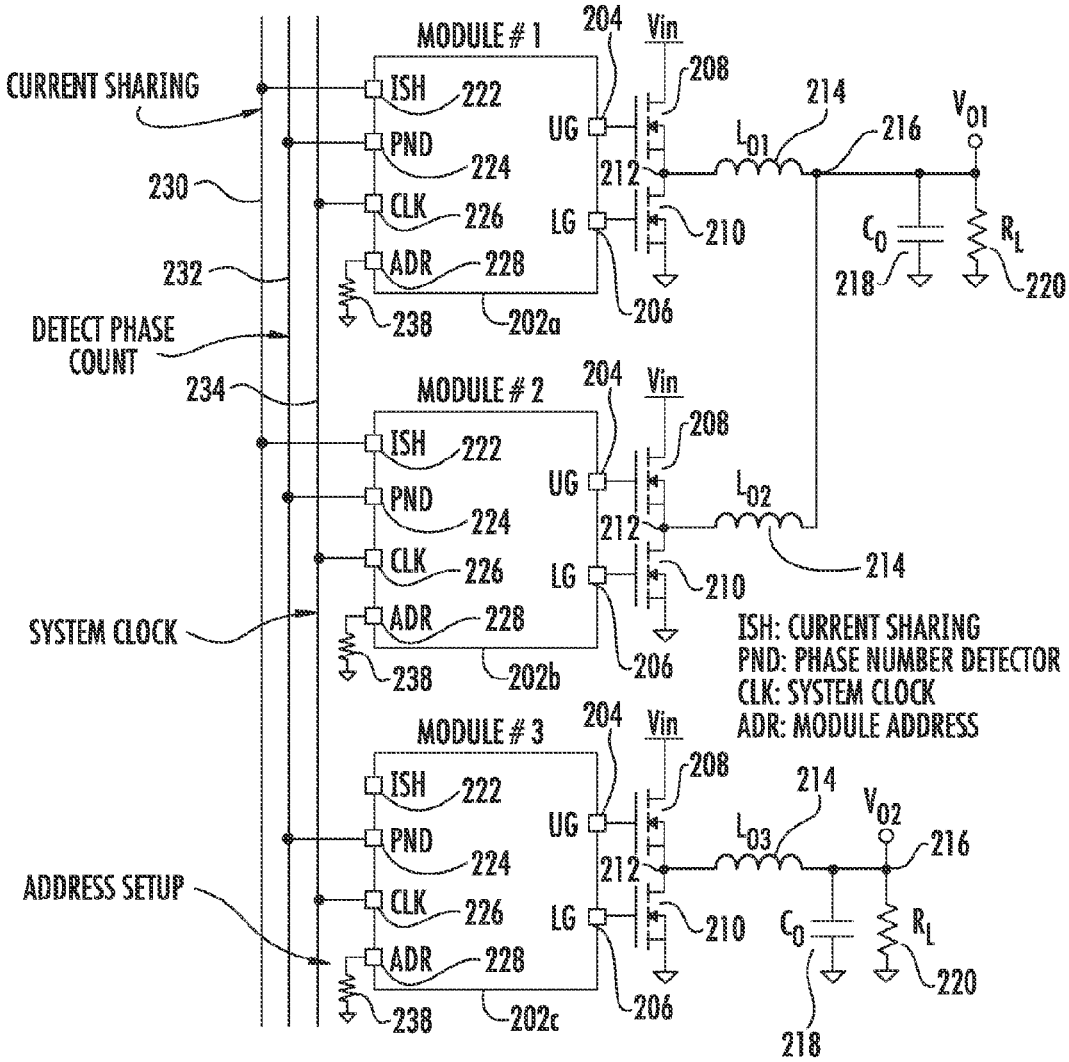
FIG. 2 is a block diagram illustrating a number of interconnected voltage regulators.

Referring now to FIG. 2, there are illustrated a number of interconnected voltage regulator modules 202. The voltage regulator modules 202 have an upper gate drive output 204 and a lower gate drive output 206 that are interconnected with the gates of an upper gate switching transistor 208 and lower gate switching transistor 210, respectively. The upper gate switching transistor 208 comprises a P-channel or N-channel transistor that is connected between the input voltage node $V_{IN}$ and a phase node 212. An inductor 214 is connected between phase node 212 and the output voltage node 216. A capacitance 218 and resistor load 220 are connected in parallel between the output voltage node 216 and ground. The output voltage node 216 may have multiple inductors 214 connected thereto to provide a multiple phase voltage node 216 as illustrated with respect to module #1 and module #2 or may include additional output voltages as illustrated with respect to module #3.

Each of the modules 202 includes a current sharing pin (ISH) 222, a phase number detector pin (PND) 224, a system clock pin (CLK) 226 and a module address pin (ADR) 228. The current sharing pin 222 of each of the modules 202a and 202b which support a common output voltage are connected with the current sharing line 230. The current sharing line 230 carries information about the average current within the multiphase system of voltage regulators. The phase number detector line 232 carries information enabling a determination of the total number of voltage modules 202 present within the system and using this information, each module can determine its relative order within the system. The clock line 234 connects with the clock pin 226 and is used for synchronizing all voltage regulator modules to operate relative to the same clock frequency. The address pin 228 enables the address of each of the modules 202 to be assigned via an associated resistor 238. An additional pin and line that may be used with each of the modules 202 but is not illustrated in FIG. 2 is the $I^2C$ pins and the $I^2C$ bus which enables each of the modules to communicate using the $I^2C$ serial communications protocol.

Figure 3:
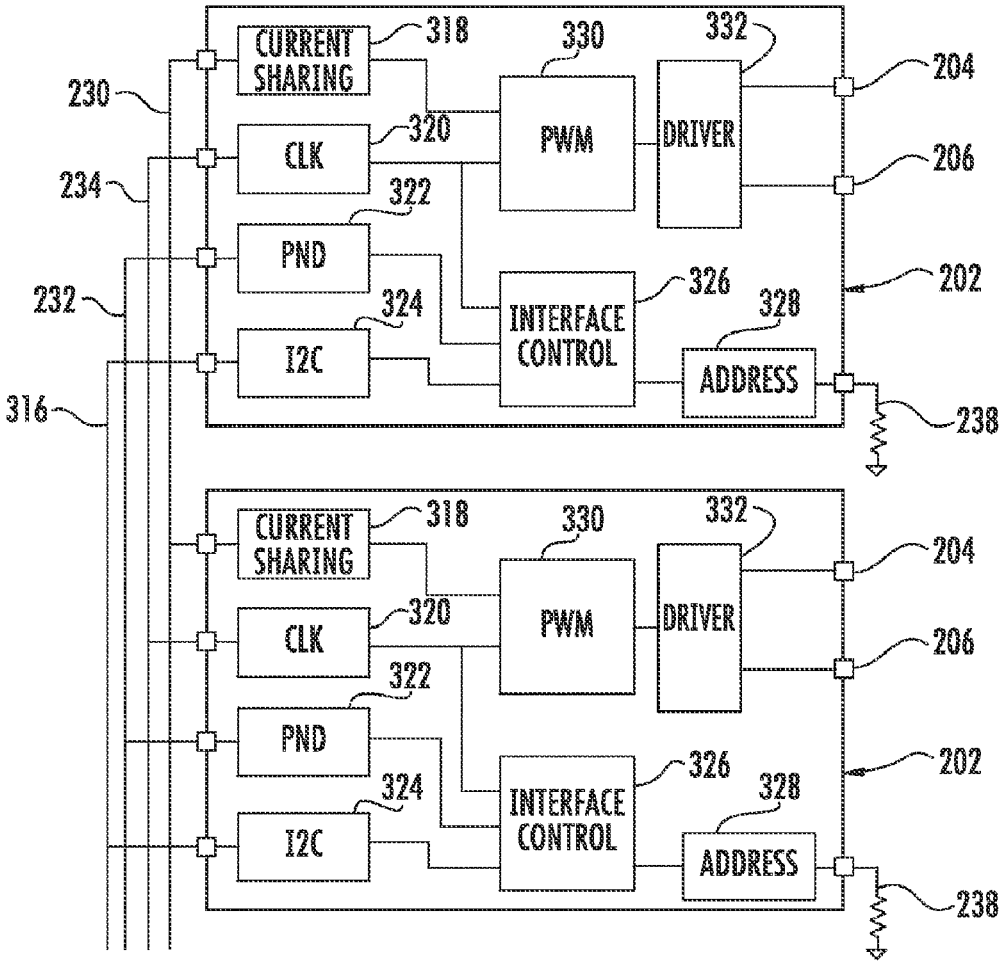
FIG. 3 is a block diagram more fully illustrating the internal components of the interconnected voltage regulators.

Referring now to FIG. 3, there is illustrated a block diagram of the internal components of one embodiment of a voltage regulator module 202. The modules 202 include the capability of fault tolerant synchronization and phase number counting and ordering. Each module 202 is connected to four common bus lines. These include the current sharing line 230, a clock synch line 234, a phase number detector line 232 and the $I^2C$ bus line 316. Each module 202 includes a current sharing interface 318 for providing current sharing information between the modules over the current sharing line 230. The clock interface 320 enables communications over the clock line 234 relating to the synchronization clock between the modules 202. This enables each of the modules to achieve synchronization with an associated master module. The phase number detector interface 322 provides for communications between each of the modules 202 relating to the total number of modules 202 connected to the bus line and enables each module to determine its relative order within the system. The $I^2C$ interface block 324 enables the module to carry out communications over the $I^2C$ interface using the $I^2C$ communications protocol.

Interface control logic 326 controls operations of the clock interface block 320, PND interface block 322 and $I^2C$ interface block 324 in conjunction with address information determined by the address block 328. The address block 328 determines the address of the particular module 202 responsive to the associated resistor 238. The PWM block 330 generates PWM control signals to the driver circuitry 332 responsive to current sharing information received from current sharing block 318 and clock information received from the clock interface 320. The driver circuitry 332 provides the upper and lower gate drive control signal via associated pins 204 and 206, respectively.

Figure 4:
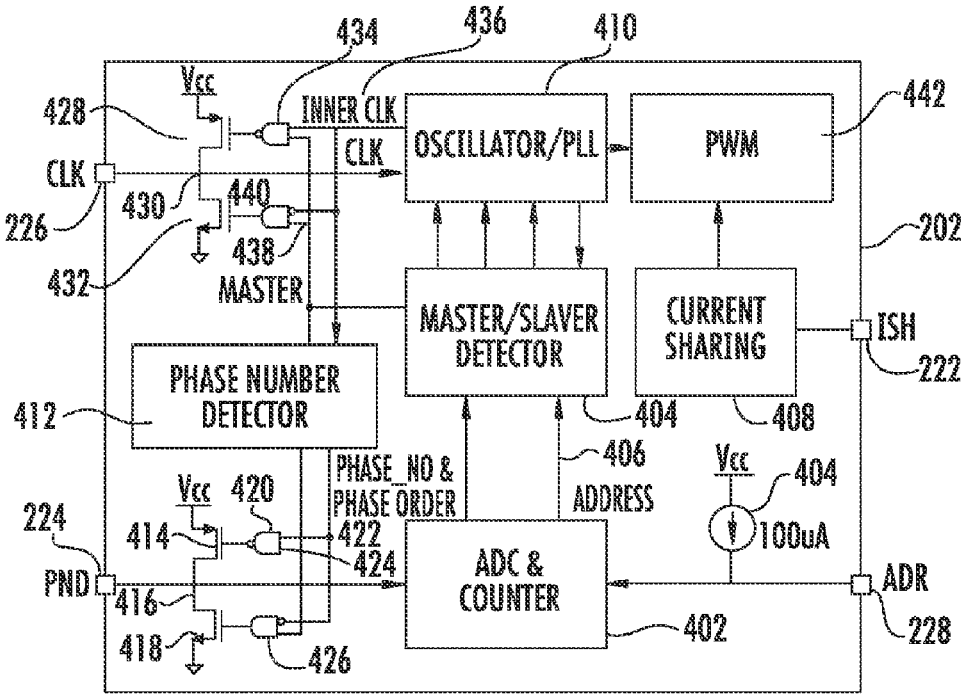
FIG. 4 is a block diagram more fully illustrating the internal components of a voltage regulator including dynamic phase timing control.

Referring now to FIG. 4, there is more particularly illustrated an embodiment of the voltage regulator drive module 202 that provides a number of key features including multiphase capability, automatically/dynamically detecting an operating phase number of the associated module 202, automatic phase timing adjustments of the module 202 and the ability to reassign a master clock in the case of master failure. The module 202 additionally supports n+m redundancy. The module 202 of FIG. 4 has its address determined by the resistor 238 connected to the address pin 228. The value of the resistor 238 connected to the pin 228 is determined by the ADC and counter circuit 402 and a current source 404. The current source 404 will generate a voltage across the resistor 238 connected to the address pin 228. The analog-to-digital converter 402 will read this voltage at the address pin 228 and convert the voltage to an address assigned to the regulator module 202 for $I^2C$ communications and to determine its order within the system. The address information is provided to the master/slave detector circuit 404 via an address line 406.

Current sharing block 408 determines the average current within the system responsive to current sharing information received from the other regulator modules 202 over the current sharing pin 222. The oscillator/PLL block 410 generates an inner clock signal and uses this clock as a synchronizing clock within the regulator module 202 responsive to information received from the master/slave detector block 404 and external clock information received via the clock pin 226. The master/slave detector block 404 is able to determine whether the master clock is active by monitoring for a clock signal on the clock line via the clock pin 226. The master/slave detector block 404 enables the module 202 to seize control of the clock line as the master should the current master fail. The master/slave detector 404 enables a regulator module 202 acting as a master to control the clock bus through pin 226. Likewise, if the module 202 is acting as a slave, the master/slave detector 404 will enable the module to synchronize its inner clock to the clock signal received over pin 226.

The phase number detector 412 assists in determining the number of phases associated with a particular system and further enables determination of the order of communication of the associated module 202 with respect to the other modules responsive to information received over the phase number detector pin 224. The phase number detector 412 enables the module 202 to send a pulse to the PND bus via the PND pin 224. The phase number detector 412 monitors the PND line over the PND pin 224 in order to determine the total phase number of the multiphase regulator system associated with the module 202 and determine its order within the system as will be more fully described herein below. Logic associated with the phase number detector 412 and phase number detector pin 224 includes a pair of transistors connected between the reference voltage VCC and ground. A P-channel transistor 414 has its source/drain path connected between the VCC node and node 416. An N-channel transistor 418 has its drain/source path connected between node 416 and ground. Node 416 is connected to PND pin 224 and is also provided as an input to the ADC and counter 402. The gate of transistor 414 is connected to the output of a NAND gate 420. The inputs of NAND gate 420 are connected to node 422 and node 424. Each of these nodes are connected to the phase number detector 412. The gate of transistor 418 is connected to the output of an AND gate 426. The inverted input of AND gate 426 is connected to node 422 and the non inverted input of AND gate 426 is connected to node 424.

Additional logic circuitry is also associated with the clock pin 226, phase number detector 412 and oscillator 410 with respect to providing the inner and external clock signals. A P-channel transistor 428 has its source/drain path connected between the VCC node and node 430. An N-channel transistor 432 has its drain/source path connected between node 430 and the ground node. Node 430 is connected to the CLK pin 226 and is also provided as an input to the oscillator/PLL 410 as the external clock signal. A NAND gate 434 has its output connected to the gate of transistor 428. The input of NAND gate 434 is connected to node 436 which is the inner clock signal that is provided from the oscillator 410; this signal also is connected to the phase number detector 412. The other input of NAND gate 434 is connected to node 438. An AND gate 440 has its output connected to the gate of transistor 432. The inverted input of AND gate 440 is connected to node 436. The non-inverted input of AND gate 440 is connected to node 438.

The PWM block 442 provides the upper and lower gate drive signals that are provided from the module 202 responsive to the current sharing information from current sharing block 408 and the clock signals provided from oscillator/PLL 410.

Figure 5:
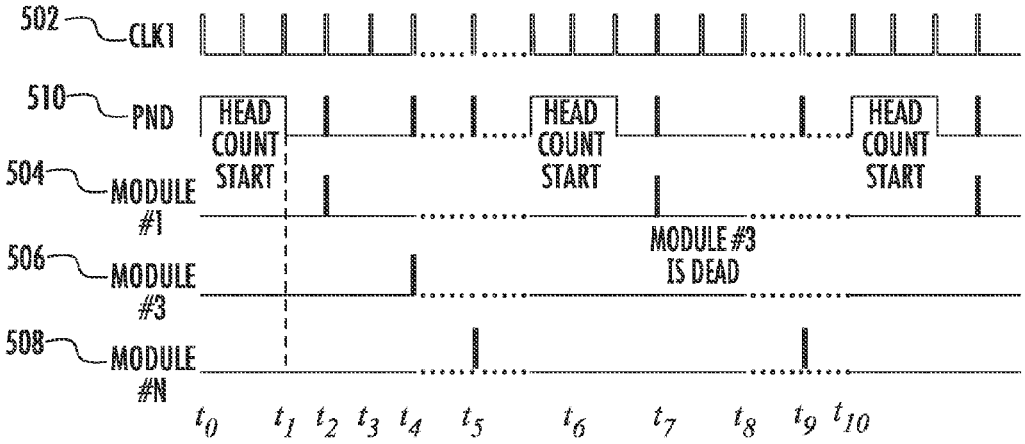
FIG. 5 is a timing diagram illustrating the operation of the phase number detector.

Referring now more particularly to FIG. 5, there is illustrated the manner in which the phase number detector 412 determines the number of phases associated with the system. The CLK1 signal 502 represents the master clock signal with which the internal clock of each module 202 connected with the bus is synchronized. The clock signal controls the operation of the multiphase regulator system and the determination of the number of phases by the phase number detector 412. To initiate the phase number detection by the phase number detector 412, the master voltage regulator module will hold the PND line high for two clock cycles. In the illustration in FIG. 5 this occurs the first time from time $T_0$ to time $T_1$. This pulse is referred to as the head count start pulse and initiates the determination of the number of phases in the voltage regulator. The master holds the PND line high by turning on transistor 414 that connects the PND pin 224 to the reference voltage VCC pulling the PND line high.

Each of the slave modules connected to the PND line will detect the PND line being pulled high for two clock cycles of the CLK1 clock signal 502. At the falling edge of the head count start pulse at time $T_1$, each slave module connected to the PND line will initiate an internal timer to begin counting the number of pulses of the CLK1 signal 502 in order to determine a time period that the associated modules should wait before transmitting a short pulse on the PND line. Each slave module connected to the PND line will raise the bus high at a time delay corresponding to the address of the module. The time delay $T_d$ is different for each module connected to the system. This will ensure that there will be no overlap between pulses transmitted by various modules within the system.

FIG. 5 illustrates three modules, module #1, module #3 and module #N that are connected to the PND bus. Module #1 will generate a pulse on the PND line at time $T_2$. The delay between time $T_1$ and $T_2$ is equivalent to the delay time $T_d$. The next illustrated pulse is generated by module #3 at time $T_4$. The time period between time $T_1$ and time $T_4$ represents 3 times the delay time $T_d$. Finally, the final pulse from module #N is generated at time $T_5$. In this case, the time delay between time $T_1$ and time $T_5$ represents the delay time $T_d \times N$. FIG. 5 separately illustrates each of the pulses generated by module #1, module #3 and module #N at 504, 506 and 508, respectively. Similarly, the same pulse is reflected on the waveform PND 510 following the head count start pulse such that the PND 510 waveform represents the accumulated pulses on the PND line.

During execution of the pulses following the head count start pulse, each module via phase number detector 412 will count the number of pulses occurring both before and after the time which it transmits its own pulse. During the head count activity initiated by the head count start pulse, each module 202 will be monitoring the PND line. At the end of the wait time from the head count start pulse, each module will know the number of modules present ahead of itself by counting the number of pulses before transmission of its own pulse. Each module will also know the number of modules present after itself by counting the number of pulses transmitted after it transmits its own pulse. Finally, each module will note the total number of modules present by counting the total number of pulses that have been transmitted. Each module uses this information to adjust its relative phase shift with respect to the entire system as will be described more fully herein below. As can be seen, the phase number detector may repeat this process as many times as necessary by pulling the head count start pulse high for the determined number of cycles that initiates the process.

Figure 6:
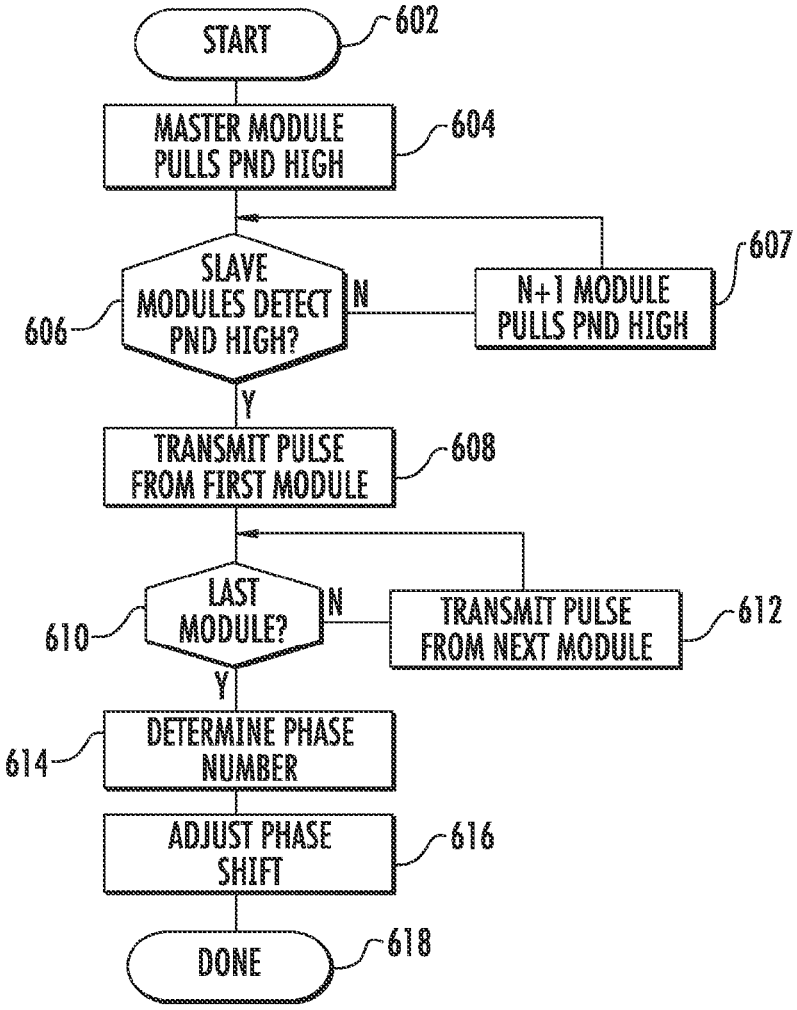
FIG. 6 is a flow diagram describing the operation of the phase number detector.

Referring now to FIG. 6, there is illustrated a flow diagram describing the operation of the phase number detector within the system. The process is initiated at step 602 and the head count start pulse is initiated on the PND line at step 604 by the master module. Phase number detectors within the slave modules determine at inquiry step 606 whether the PND has gone high for the correct number of cycles. If not, the N+1 slave module pulls the PND high at step 607. Once inquiry step 606 determines that the PND line has gone high for a sufficient period of time, a pulse is transmitted from the first module after the appropriate delay at step 608. The pulse from a module is transmitted after the appropriate delay of $T_d$. Inquiry step 610 determines if this is the last module within the system if it counts zero pulses after it has transmitted its own pulse or if it has reached the pre-determined limit on the number of modules for the system, and if not, control passes to step 612 wherein the next module transmits its pulse after the appropriate delay. Once each of the modules has transmitted a pulse as determined at inquiry step 610, the total number of phases within the system may be determined at step 614. With the total number of phases determined, the phases associated with each module may be phase shifted as necessary at step 616. The process is completed at step 618.

Figure 7:
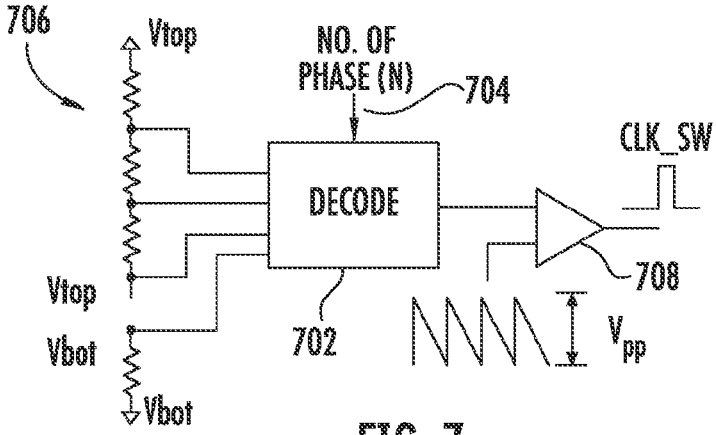
FIG. 7 is a block diagram illustrating the circuitry for providing automatic phase timing adjustment.

Referring now to FIG. 7, there is illustrated the circuitry for generating the appropriate phase shift within the module 202. This circuitry would be located in the oscillator block at 410. In a prior art multiphase system, the relative phase shift is manually set and is fixed during operation of the regulator. Each module has no knowledge of an individual phase of the regulator shutting down and cannot react to this event. Within the present system, the number of phases is automatically detected at system initialization and will keep operating during run time. With knowledge of the adjustment in the number of phases, the phase shift of the remaining phases may be adjusted in real time to ensure a smooth voltage output. The number of phases determined by the phase number detector 412 may be provided to decoding circuitry 702 via an input 704. Based upon the number of phases, the decoder circuitry 702 can select a particular input from a resistor divider network 706. The resistor divider network 706 provides a variety of different voltages to the decoding circuitry 702 from a voltage vtop down to a voltage vbottom. The decoding circuitry 702 outputs the decoded voltage $V_d$ representing the phase voltage shift to a first input of a comparator 708. The other input of the comparator 708 receives a ramp voltage having a peak to peak voltage of VPP. The output of the comparator 708 provides a PWM switching signal CLK_SW that is provided to the PWM circuit 442. The CLK_SW signal is used by the PWM block 442 to generate a PWM pulse in the proper firing order.

Figure 8:
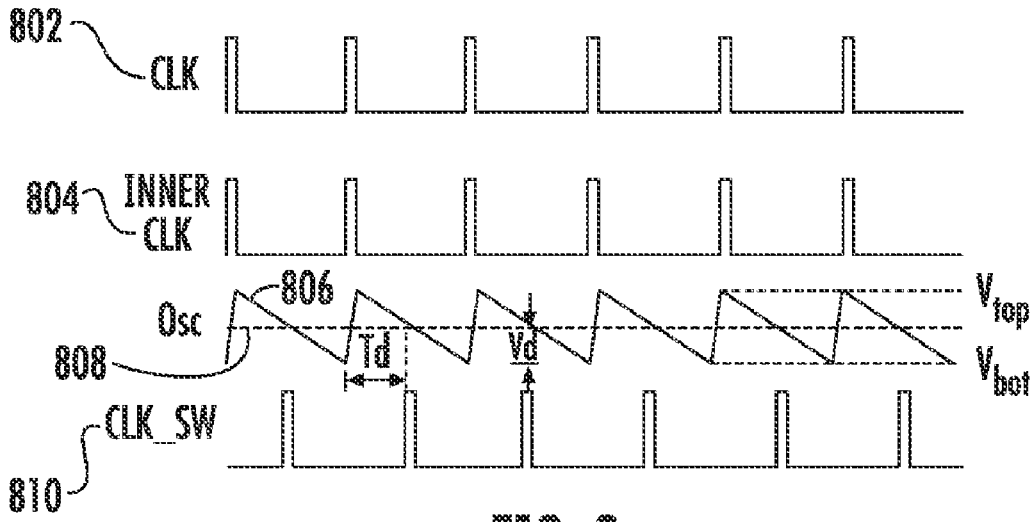
FIG. 8 is a timing diagram illustrating the phase timing adjustment.

Referring now to FIG. 8, there are illustrated the wave forms associated with generation of the CLK_SW signal. The clock signal 802 is provided on the CLK pin 226 of the module 202. The oscillator/PLL 410 utilizes the clock signal to generate the inner clock signal 804 that is used for generating the internal clock to all components within the module 202. The oscillator/PLL 410 receives the ramp signal 806 and the phase shift voltage 808 and utilizes the intersection of these waveforms to generate the CLK_SW pulse 810. As can be seen, the CLK_SW pulse is generated each time the ramp signal 806 falls below the phase shift voltage $V_d$ 808. Based on the total phase number n and the address of the module, the phase shift is equal to ADDR×360 divided by n. If the peak to peak voltage of the oscillator ramp signal 806 is VPP, the threshold voltage $V_d$ used for the time delay is given by $V_d$=(N−ADDR)×VPP/N and can be calculated by $V_d$=Vbot+(Vtop−Vbot) the number of phases before/the number of phases after. Based on the total phase number, and the phase number of the module, a proper voltage offset $V_d$ can be generated. By comparing the oscillator ramp signal with the offset voltage $V_d$, the clock for the PWM control (CLK_SW) can be generated.

Figure 9:
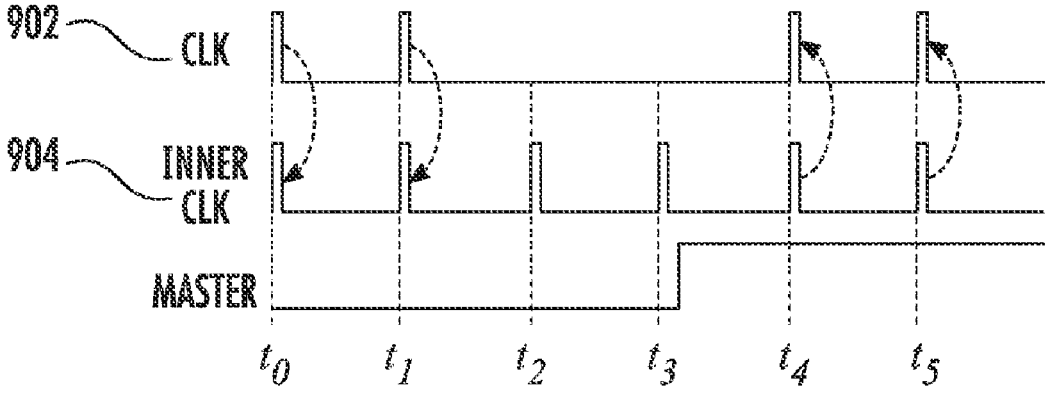
FIG. 9 is a timing diagram illustrating reassignment of the master clock control in the case of master failure.

The master clock signal is normally provided on the CLK line of the system from the master module and is monitored and used by each of the slave modules for synchronizing their inner clock signal. Referring now to FIG. 9, this is illustrated from time $T_0$ to time $T_1$ wherein the clock signal 902 is used for generating the synchronous inner clock signal 904. After the occurrence of a power on reset or if the master module is down due to being disabled or dead, there will be no clock signal on the CLK bus line. This process is illustrated at times $T_2$ and $T_3$. After waiting for a period of n clock cycles when no clock pulses are detected, where n depends upon the address of a particular module, each module 202 will attempt to become the new master by sending its inner clock signal to the clock bus line. During this process, in case of a conflict between two different modules 202 trying to take control of the clock line at the same time, each module will output a clock signal onto the clock bus. Both will compare the clock bus signal to their own inner clock signal. If these are different, the module will give up control and become a slave. Thus, the module with the higher clock frequency will give up clock control. This module will fail to pull the clock bus high while the other module is attempting to pull the clock bus low. This is due to the fact that the pulling down capability of the clock output stage is much stronger than the pulling up capability.

Referring now back to FIG. 4, the pulling up capability of the clock logic is initiated by turning on transistor 428. This connects the clock pin 226 to the reference voltage VCC. The pull down capability of the clock line is initiated by turning on transistor 432. This connects the clock pin 226 to ground. The particular module 202 is initiated as the master by pulling the master line high as illustrated just past time $T_3$. This occurs by pulling the master line from the phase detector 412 high which drives node 438 applied to NAND gate 434 and AND gate 440 high which causes the inner clock signal applied to NAND gate 434 and AND gate 440 to be output at the clock pin 226.

Figure 10:
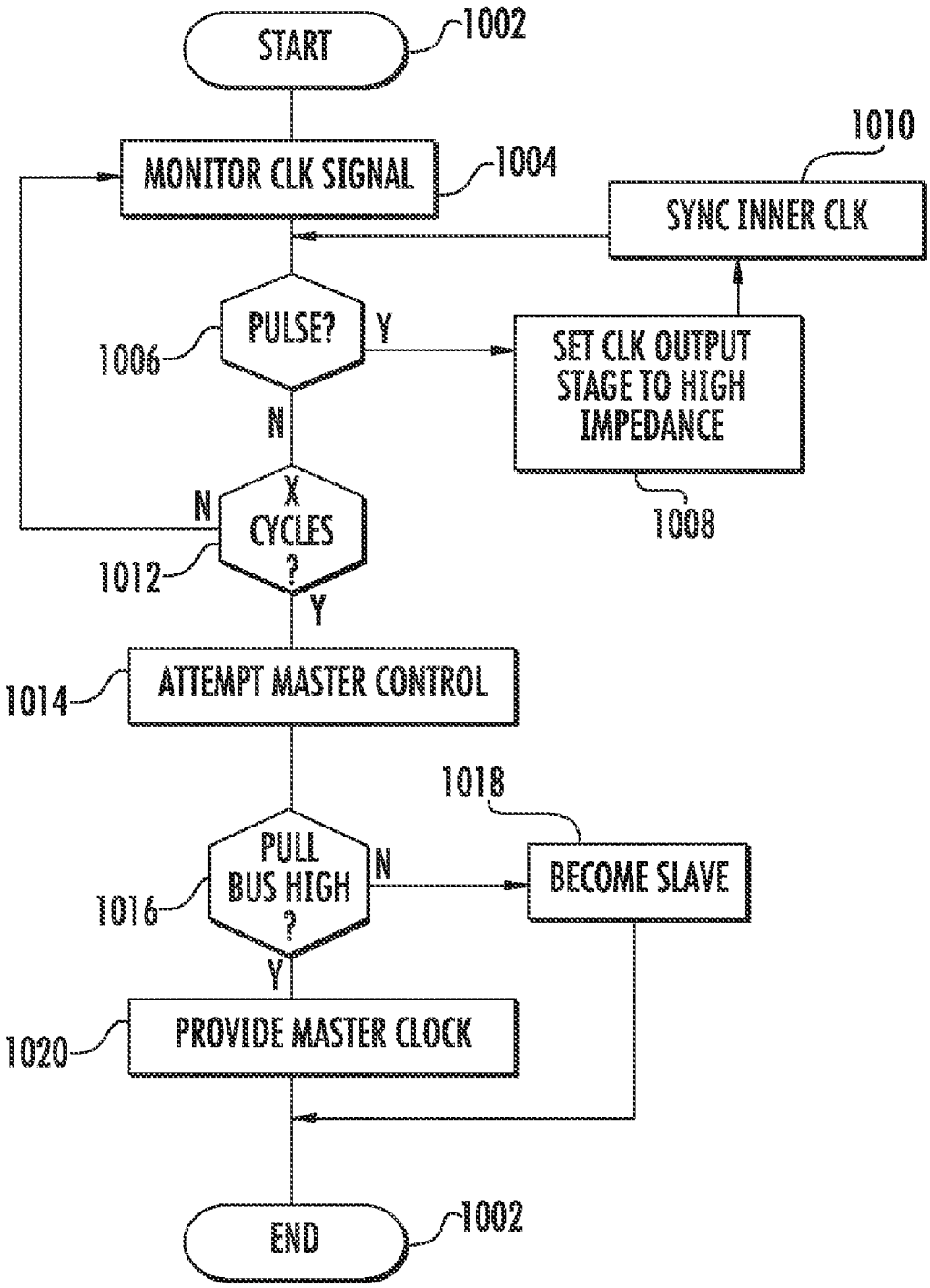
FIG. 10 is a flow diagram describing the reassignment of a master in the case of master failure.

Referring now also to FIG. 10, there is illustrated a flow diagram describing the operation of the automatic assignment of a master module. The process is initiated at step 1002 and each of the slave devices will monitor for the occurrence of the clock signal on the clock line at step 1004. Inquiry step 1006 determines if a clock voltage is detected on the clock signal line. If a clock signal is detected, the clock output of the monitoring slave is set to a high impedance level at step 1008, and the inner clock signal is synchronized with the clock signal at step 1010. If inquiry step 1006 determines that no pulse was detected, inquiry step 1012 determines how long no pulse has been detected. If it has not occurred for a desired number of x cycles, control passes back to step 1004 to continue monitoring for the clock signal.

When inquiry step 1012 determines that the clock signal has been gone for a sufficient number of cycles, a module will attempt to take over master control at step 1014. Inquiry step 1016 will determine if the module can pull the clock line high. If the module cannot pull the clock line high, the module will cease attempting to obtain master control and become a slave module at step 1018. If inquiry step 1016 determines that it can pull the bus high, the output stage of the module will be set to enable the module to provide the master clock at step 1020. The process is completed at step 1022 and the new master remains in control until it is reset or fails.

Figure 11:
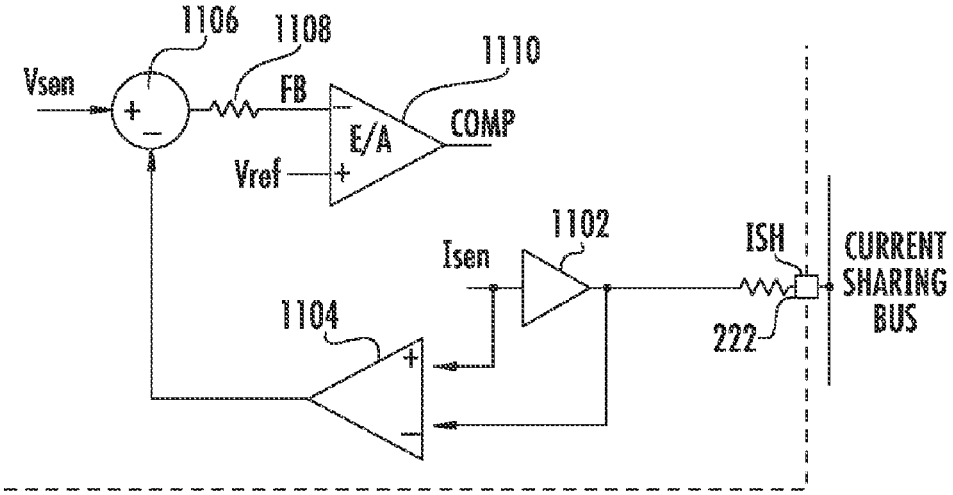
FIG. 11 is a block diagram illustrating the current sharing circuitry of the voltage regulator.

Referring now to FIG. 11, there is more particularly illustrated the circuitry within the current sharing block 408 associated with the current sharing pin 222. An amplifier 1102 has its input connected to receive a sensing current ISEN. The input of the buffer amplifier 1102 and the ISEN current are also connected to the non-inverting input of an amplifier 1104. The output of the buffer amplifier 1102 is connected to a resistor which is then connected to the current sharing pin 222. The output of buffer amplifier 1102 is also connected to the inverting input of the amplifier 1104. The output of the amplifier 1104 goes to a summing circuit 1106 wherein the output of the amplifier 1104 is subtracted from a sensed voltage VSEN. The output of the summing circuit 1106 is provided through a resistor 1108 to the inverting input of an error amplifier 1110. The error amplifier 1110 compares the feedback voltage received through resistor 1108 with a reference voltage $V_{REF}$ applied to its non-inverting input to generate an error voltage COMP. This uses a current sharing scheme that can be adopted for multiple modules running in parallel which are each connected to the current sharing via the current sharing pin 222.

For existing regulators which support n+m redundancy or which support dynamic phase adding or dropping, phase timing remains fixed in the nominal state as phases are disabled. The present disclosure provides a method to dynamically adjust the timing of the remaining enabled phases so that the phase timing is optimally spaced. The benefit of this scheme is minimized input and output ripple regardless of the number of active phases for a given multiphase regulator. For a multi output regulator, the benefit is limited to minimize input ripple only. An additional benefit of the invention is to support n+m redundancy support for multiple input rails up to 1 per phase or regulator.

It will be appreciated by those skilled in the art having the benefit of this disclosure that this dynamic phase timing control for multiple regulators or phases provides a realtime adjustment of the number of phases and the phase shift associated with a regulator. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A drive control circuit for generating switching drive signals for a single phase of a multiphase voltage regulator, comprising:

an interface for connecting the drive control circuit to a single bus, said interface including at least a clock interface for connecting to a clock line of the single bus and a phase number detect interface for connecting to a phase number detect line of the single bus;

driver circuitry for generating the switching drive signals for the voltage regulator responsive to a clock signal;

clock circuitry for generating the clock signal responsive to a monitored external clock signal provided on the clock interface; and a phase number detector for determining a number of active phases in the multiphase voltage regulator in real time responsive to an indicator received over the single bus on the phase number detect interface monitored by the phase number detector, wherein the phase number detector adjusts a phase timing of a phase associated with the drive control circuit responsive to the determined number of active phases.

2. The drive control circuit of claim 1, wherein the phase number detector generates a pulse on the single bus over the phase number detect interface at a predetermined period of time responsive to a detection of the indicator on the phase number detect interface.

3. The drive control circuit of claim 1, wherein the phase number detector determines the total number of active phases in the multiphase voltage regulator responsive to a plurality of pulses detected on the phase number detect interface, wherein each of the plurality of pulses are associated with another drive control circuit connected to the single bus.

4. The drive control circuit of claim 1 further including a master detector module for monitoring the external clock signal on the clock interface of the drive control circuit and attempting to provide the clock signal of the drive control circuit as the external clock signal over the single bus for the multiphase voltage regulator responsive to the external clock signal not being present on the clock input for a predetermined period of time.

5. The drive control circuit of claim 4, wherein the master detector module attempts to pull the clock line on the single bus to a logical low level through the clock interface to attempt to provide the clock signal as the external clock signal.

6. The drive control circuit of claim 4, wherein the master detector sets the clock interface at a high impedance level if the clock signal may not be provided as the external clock signal.

7. The drive control circuit of claim 1, further including:

a current source for applying a current across an external resistor connected to an address pin of the drive control circuit to create a voltage across the external resistor; and an analog to digital converter for determining an address associated with the drive control circuit responsive to the voltage across the external resistor.

8. A multiphase voltage regulator, comprising:

a plurality of drive control circuits providing drive control signals, each drive control circuit associated with a phase of the multiphase voltage regulator;

a plurality of voltage regulators, each associated with one of the plurality of drive control circuits, for generating an output voltage responsive to an input voltage and the drive control signals of the associated drive control circuit;

wherein each of the drive control circuits further comprises:

an interface for connecting the drive control circuit to a single bus, said interface including at least a clock interface for connecting to a clock line of the single bus and a phase number detect interface for connecting to a phase number detect line of the single bus;

driver circuitry for generating [the] switching drive signals for the voltage regulator responsive to a clock signal;

clock circuitry for generating the clock signal responsive to a monitored external clock signal provided on the clock interface; and a phase number detector for determining a number of active phases in the multiphase voltage regulator in real time responsive to an indicator on [a] *the* phase number detect interface monitored by the phase number detector, wherein the phase number detector further adjusts a phase timing of the phase associated with the drive control circuit responsive to the determined number of active phases.

9. The multiphase voltage regulator of claim 8, wherein the phase number detector determines the total number of active phases in the multiphase voltage regulator responsive to a plurality of pulses detected on the phase number detect interface, wherein each of the plurality of pulses are associated with another drive control circuit connected to the single bus.

10. The multiphase voltage regulator of claim 8 further including a master detector module for monitoring the external clock signal on the clock interface of the drive control circuit and attempting to provide the clock signal of the drive control circuit as the external clock signal over the single bus for the multiphase voltage regulator responsive to the external clock signal not being present on the clock input for a predetermined period of time.

11. The multiphase voltage regulator of claim 10, wherein the master detector module attempts to pull the clock line on the single bus to a logical low level through the clock interface to attempt to provide the clock signal as the external clock signal.

12. The drive control circuit of claim 10, wherein the master detector sets the clock interface at a high impedance level if the clock signal may not be provided as the external clock signal.

13. The multiphase voltage regulator of claim 8, further including:

a current source for applying a current across an external resistor connected to an address pin of the drive control circuit to create a voltage across the external resistor; and an analog to digital converter for determining an address associated with the drive control circuit responsive to the voltage across the external resistor.

14. A method for determining a number of active phases in a multiphase voltage regulator having a plurality of voltage regulators interconnected over a single bus, comprising the steps of:

generating a plurality of pulses having a preselected width on a phase number detector line of the single bus;

determining the number of active phases in the multiphase voltage regulator in real time responsive to the plurality of pulses on the phase number detector line of the single bus; and adjusting a phase timing of a phase associated with each of a plurality of drive control circuits responsive to the determined number of active phases, each of the plurality of drive control circuits including an interface for connecting the drive control circuit to the single bus, said interface including at least a clock interface for connecting to a clock line of the single bus and a phase number detect interface for connecting to a phase number detect line of the single bus.

15. The method of claim 14 further including the steps of:

monitoring an external clock signal on a clock line of the single bus of the multiphase voltage regulator;

detecting an absence of the external clock signal on the clock line for a predetermined period of time; and attempting to provide a clock signal of at least one of the drive control circuits as the external clock signal for the multiphase voltage regulator responsive to the external clock signal not being present on the clock line for the predetermined period of time.

16. The method of claim 15, wherein the step of attempting to provide a clock signal further includes the step of attempting to pull the clock line to a logical low level.

17. The method of claim 15, further including the step of setting a clock input associated with one of the plurality of drive circuits to a high impedance level if the clock signal may not be provided as the external clock signal.

18. The method of claim 14, further including the step of:

applying a current across an external resistor connected to an address pin of the drive control circuit to create a voltage across the external resistor; and determining an address associated with the at least one drive control circuit responsive to the voltage across the external resistor.

*19. A drive control circuit for generating switching drive signals for a single phase of a multiphase voltage regulator, comprising:*

*an interface for connecting the drive control circuit to a single bus, said interface including at least a clock interface for connecting to a clock line of the single bus and a phase number detect interface for connecting to a phase number detect line of the single bus;*

*driver circuitry for generating the switching drive signals for the voltage regulator responsive to a clock signal;*

*clock circuitry for generating the clock signal responsive to a monitored external clock signal provided on the clock interface; and*

*a phase number detector for determining a number of active phases in the multiphase voltage regulator responsive to an indicator received over the single bus on the phase number detect interface monitored by the phase number detector, wherein the phase number detector adjusts a phase timing of a phase associated with the drive control circuit responsive to the determined number of active phases.*

*20. The drive control circuit of claim 19, wherein the phase number detector generates a pulse on the single bus over the phase number detect interface at a predetermined period of time responsive to a detection of the indicator on the phase number detect interface.*

*21. The drive control circuit of claim 19, wherein the phase number detector determines the total number of active phases in the multiphase voltage regulator responsive to a plurality of pulses detected on the phase number detect interface, wherein each of the plurality of pulses are associated with another drive control circuit connected to the single bus.*

*22. A multiphase voltage regulator, comprising:*

*a plurality of drive control circuits providing drive control signals, each drive control circuit associated with a phase of the multiphase voltage regulator;*

*a plurality of voltage regulators, each associated with one of the plurality of drive control circuits, for generating an output voltage responsive to an input voltage and the drive control signals of the associated drive control circuit;*

*wherein each of the drive control circuits further comprises:*

*an interface for connecting the drive control circuit to a single bus, said interface including at least a clock interface for connecting to a clock line of the single bus and a phase number detect interface for connecting to a phase number detect line of the single bus;*

*driver circuitry for generating switching drive signals for the voltage regulator responsive to a clock signal;*

*clock circuitry for generating the clock signal responsive to a monitored external clock signal provided on the clock interface; and*

*a phase number detector for determining a number of active phases in the multiphase voltage regulator responsive to an indicator on the phase number detect interface monitored by the phase number detector, wherein the phase number detector further adjusts a phase timing of the phase associated with the drive control circuit responsive to the determined number of active phases.*

*23. A method for determining a number of active phases in a multiphase voltage regulator having a plurality of voltage regulators interconnected over a single bus, comprising the steps of:*

*generating a plurality of pulses having a preselected width on a phase number detector line of the single bus;*

*determining the number of active phases in the multiphase voltage regulator responsive to the plurality of pulses on the phase number detector line of the single bus; and*

*adjusting a phase timing of a phase associated with each of a plurality of drive control circuits responsive to the determined number of active phases, each of the plurality of drive control circuits including an interface for connecting the drive control circuit to the single bus, said interface including at least a clock interface for connecting to a clock line of the single bus and a phase number detect interface for connecting to a phase number detect line of single bus.*

* * * * *